United States Patent [19]

Bruens

[11] Patent Number: 5,022,583
[45] Date of Patent: Jun. 11, 1991

[54] REGISTER BLADE MOVER

[76] Inventor: Jean-Marie Bruens, 2081 René Gauthier, Varennes, Canada, J3X 1R3

[21] Appl. No.: 552,464
[22] Filed: Jul. 16, 1990
[51] Int. Cl.⁵ .......................................... G05D 23/12
[52] U.S. Cl. .................................... 236/49.5; 236/100
[58] Field of Search ............................ 236/49.5, 100; 98/40.25

[56] References Cited

U.S. PATENT DOCUMENTS

| | | | |
|---|---|---|---|
| 2,196,308 | 4/1940 | Johnston . | |
| 3,165,999 | 1/1965 | Noll | 236/49.5 X |
| 3,257,931 | 6/1966 | Lupton . | |
| 3,298,298 | 1/1967 | Iwata . | |
| 3,503,262 | 3/1970 | Staire | 236/100 X |
| 3,591,078 | 7/1971 | Feinberg | 236/100 X |
| 3,680,022 | 7/1972 | Bright | 236/100 X |
| 4,007,673 | 2/1977 | Zaloga . | |
| 4,103,673 | 8/1978 | Woodworth et al. | 236/100 X |
| 4,497,241 | 2/1985 | Ohkata . | |
| 4,541,326 | 9/1985 | Fukuda et al. . | |
| 4,729,293 | 3/1988 | Tsunoda et al. . | |
| 4,821,955 | 4/1989 | Kline et al. | 236/49.5 |

FOREIGN PATENT DOCUMENTS 254582 10/1925 Canada .

Primary Examiner—William E. Tapolcai
Attorney, Agent, or Firm—Pierre Lespérance

[57] ABSTRACT

An actuator mechanism for automatically changing and adjusting the orientation of air discharged from the register of an air distribution system solely under the variation of the supply air temperature. The actuator mechanism includes a ram exposed to the supply air and including a cylinder filled with a mixture of alkane waxes and an operating rod. The solid to liquid phase transition of the waxes with temperature increase will push the rod outwardly while a return spring will return the rod as the temperature decreases. The operating rod is connected to the register slats through a transverse arm, a common link and spring clips releasably fitted to the slats.

8 Claims, 3 Drawing Sheets

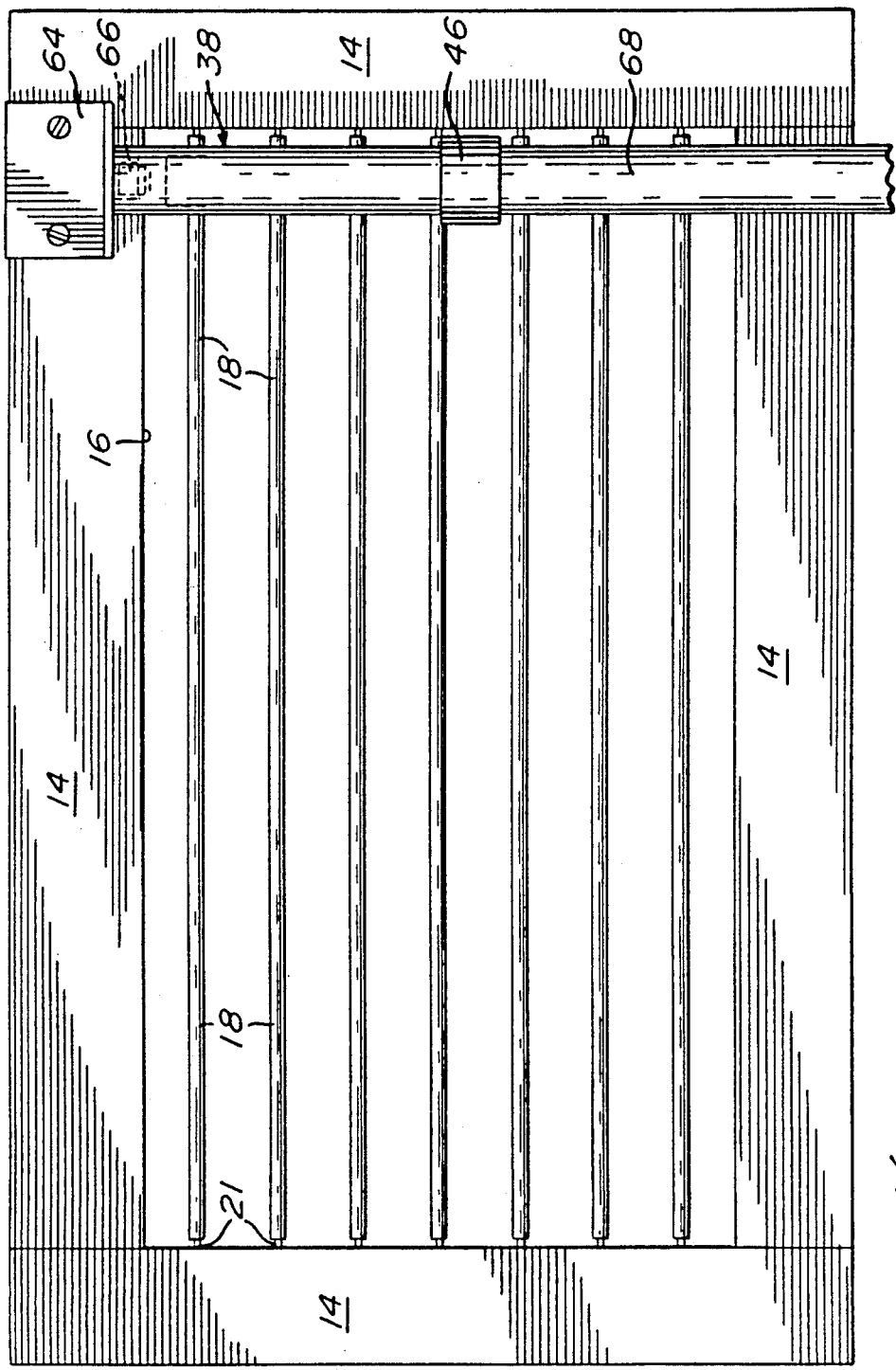

5,022,583

1

REGISTER BLADE MOVER

FIELD OF THE INVENTION

This invention relates to mechanisms for automatically adjusting the orientation of the slats of the registers of an air conditioning ductwork in accordance with the air supply temperature.

BACKGROUND OF THE INVENTION

It is desirable to automatically adjust the vertical orientation of the air flow from an air supply register, accordingly with the temperature of the supply air. Indeed, when the air flow is cool, it should be directed toward the ceiling of a room to prevent cold air from falling directly onto persons nearby. On the other hand, when the air flow is warm for winter heating, it should be directed toward the floor to prevent air stratification.

U.S. Pat. No. 3,298,298 issued in 1967 to Iwata, discloses a system for accomplishing the same function. The register slats 18 are controlled by a bellows 6, for automatically adjusting the direction of a flow of air through the register, upon change in the temperature of said flow of air. The register slats 18 are pivoted at their intermediate section to a peripheral frame through horizontal axes 19. Bellows 6 has gas sealed therein and is located within an air supply duct from an air conditioning unit. A horizontal arm 23 extends laterally of the bellows and carries a vertical common link 21 pivoted to the slats at 29, for rotating all the slats 18 about their pivotal axes upon reciprocating motion of the bellows during temperature changes.

The assembly of the bellows 6 and its return spring 15 occupies substantial space since the bellows must have a large volume for the gas to exert sufficient slat pivoting force under temperature variations. This causes an obstacle to the flow of supply air.

When the register is already installed and has slats which must be manually adjusted and therefore must have sufficient resistance to rotation to keep their adjusted position, then an automatic slat pivoting system using gas filled bellows would be impractical because of the large bellows volume which would be required.

Moreover, since the thermal fill in the bellows is a gaseous compound, the bellows stroke is not a linear function of the temperature variation. This is undesirable, in that control of the orientation of the slats within the desired temperature range is not progressive.

And what is more, the hinge mounts 29 for hingedly mounting each slat 18 to the vertical link 21, require a slot in each slat, rendering the actuator mechanism unsuitable for existing, already installed louvers.

OBJECTS OF THE INVENTION

The main object of the invention is to provide a temperature responsive or thermal actuator mechanism for register slats, which will be sufficiently powerful to operate existing register slats and which can be installed without requiring modifications to the latter.

An object of the above-noted invention is to ensure a continuous, substantially linear, automatic adjustment of the orientation of the register slats in accordance with the temperature of the air flow exiting from the register.

Another object of the invention is to provide a mechanism of the character described in which the thermal actuator occupies a small space and therefore causes little obstruction to the flow of the air supply.

SUMMARY OF THE INVENTION

In accordance with the objects of the invention, there is disclosed a temperature responsive actuator mechanism for operatively controlling and adjusting within a predetermined temperature range the orientation of a set of parallel register slats which are pivotally hinged to a common peripheral frame at the exit of a supply air duct of an air conditioning system, said actuator mechanism comprising:

(a) a ram, fixed to said frame in the path of the supply air flowing out of said duct and defining a sealed inner chamber and a reciprocatable operating rod, (b) a mixture of several compounds with progressively higher melting points, said mixture located in and filling said inner chamber, said mixture progressively changing its phase from solid to liquid within said temperature range and expanding in response to temperature increase of the supply air in said temperature range;

(c) an arm, carried by the operating rod of said piston;

(d) motion converting means, connected to said arm and to said slats to convert reciprocating motion of said operating rod into rotational motion of said slats; and (e) return biasing means, for biasing said operating rod towards said ram inner chamber;

wherein, when supply air temperature increases, the expansion of the compound mixture in said ram inner chamber forcibly biases said operating rod to move away from said sealed inner chamber, against the bias of said return biasing means, which causes operating rod retraction, when the supply air temperature decreases and produces contraction of the mixture.

Preferably, said motion converting means includes resilient open-ended clips, releasably attachable to slats of already installed registers.

Profitably, the return biasing means includes a first spring located within said inner chamber and a second spring acting on the piston rod exteriorly of said ram.

Advantageously, an overtravel system is provided, to prevent damage to the actuator mechanism or to the register slats, should the ram be exposed to temperatures beyond the upper limit of said temperature range.

BRIEF DESCRIPTION OF THE DRAWINGS

FIG. 3 is a front elevation of the register and actuator

DETAILED DESCRIPTION OF THE INVENTION

Figure 1:
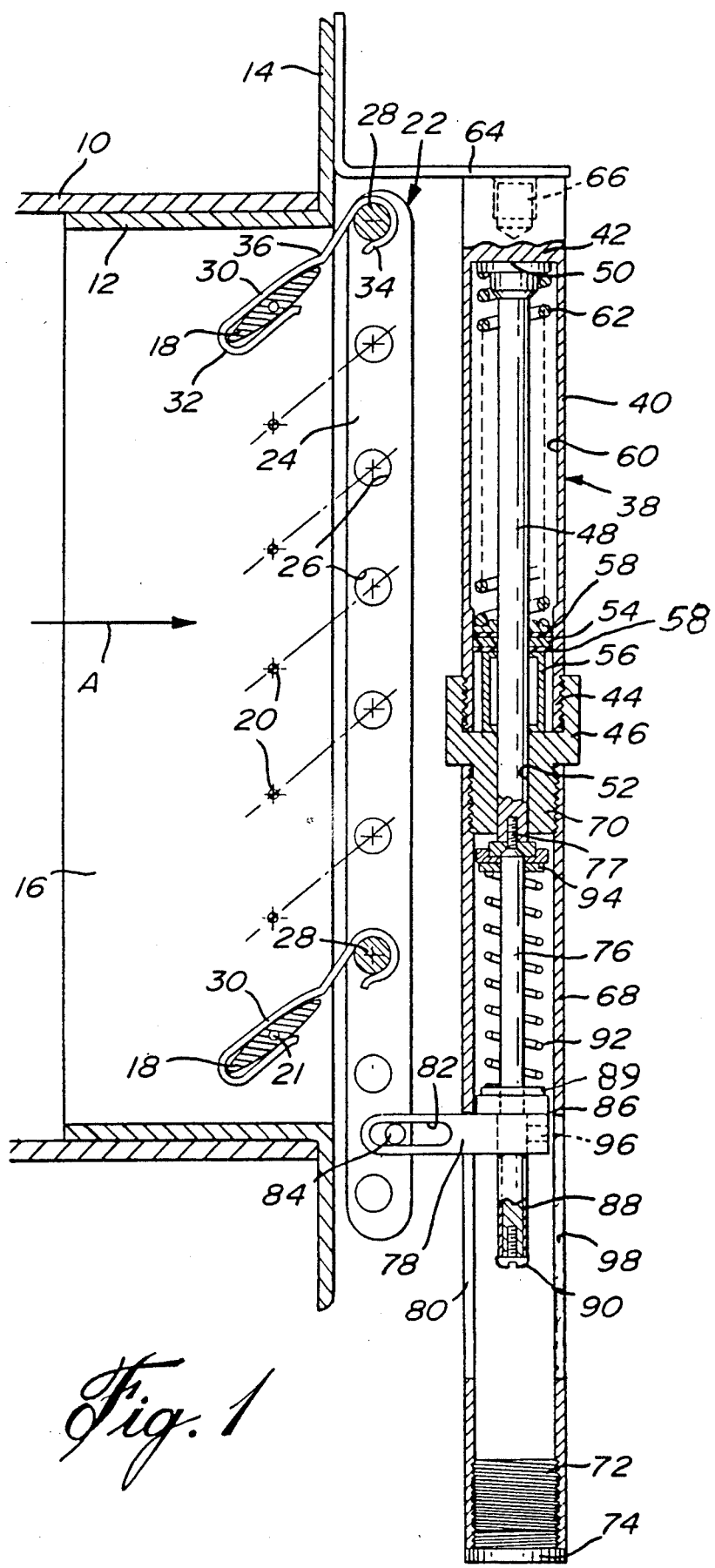
FIGS. 1 and 2 are vertical sectional views of a duct outlet, register and actuator mechanism operatively connected to the register slats for controlling their orientation, FIG. 1 showing the slats upwardly oriented and one return spring and FIG. 2 showing the slats downwardly oriented and two return springs.
Figure 2:
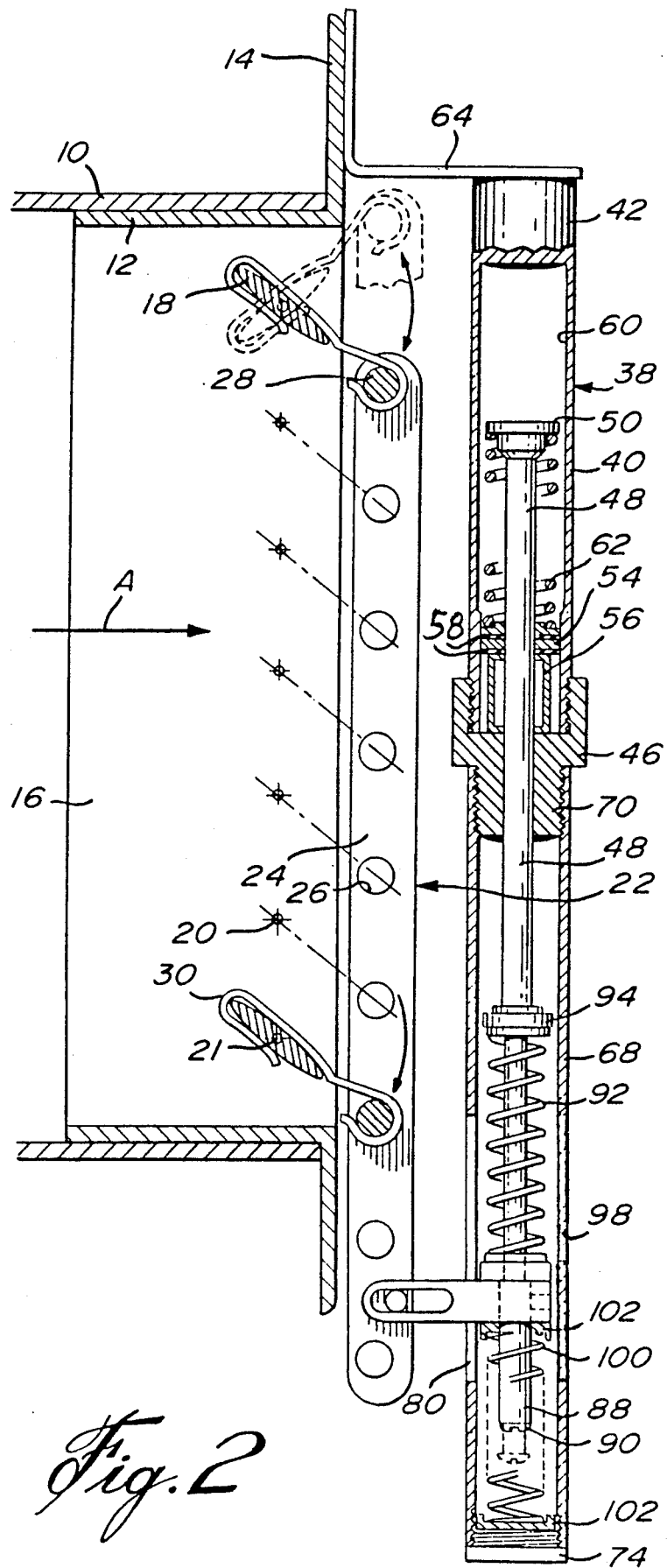

In FIGS. 1 and 2, there is shown, in sectional view, the end portion of an air supply duct 10, into the outlet of which is inserted a register frame 12 with an outturned rim 14 applied against a room wall (not shown). Air flows through duct 10 in the direction of arrow A. Duct 10 is part of a duct network supplying air in a building from a central air conditioning system. Register frame 12 defines a duct outlet 16 and carries a plurality of overlapping, sloping slats 18 which are parallel and horizontal across outlet 16. Each slat 18 is provided at its ends with a stem 21 pivotally engaging a hole 20 made in the side walls of register frame 12. Each slat 18 is of any conventional shape, for instance of elliptical contour. Normally, each slat is manually and independently oriented to a desired adjusted position.

The actuator mechanism 22 of the invention includes an elongated link 24 provided with a plurality of lengthwisely spaced through-bores 26, each of the latter being rotatably engaged by a short, cylindrical, projecting stud 28 retained in the bore 26. The number of through-bores 26 should at least be equal to that of slats 18. The distance between successive studs 28 is equal to the distance between successive holes 20. Corresponding slats 18 and studs 28 are releasably interconnected in pairs by rigid yet elastic clips 30, each of the two end portions of which forms a U, 32 and 34 respectively, substantially conforming to the shape of the respective slats and studs and surrounding them. Each clip 30 has an inner bend 36 intermediate U-shaped ends 32 and 34 to conform to the edge of slat 18 opposite the edge inserted into the U 32. This prevents accidental release of the clip 30. Thus, a reciprocating up and down link motion of link 24 will induce rotational motion of the slats 18 in holes 20 through the linkage clips 30. During this movement, studs 28 rotate in link holes 26. During this vertical motion of link 24, it is understood that there will also be a fore- and aft- motion component, since the clips 30 are rigid and of fixed length Link 24 will rotate all the slats 18 simultaneously while maintaining the same parallel between a first limit position (FIG. 1) where they deflect the air flow A upwardly, and a second limit position (FIG. 2), where they deflect the air flow A downwardly.

The actuator mechanism 22 further includes a thermal actuator or heat actuated ram 38 which comprises a rigid metallic cylinder 40 closed at one end by an integral plug 42 and having an opposite externally threaded open end portion 44 closed by a cap 46. The ram further includes an operating rod 48 and of an enlarged, spring retainer head 50. The operating rod 48 has a slide fit with the throughbore 52 of cap 46 and extends through a partition 54 retained by a sleeve 56 at the intended location in cylinder 40. Gaskets 58 carried by partition 54 engage the rod 48 and the inner surface of cylinder 40 so to define a sealed inner chamber 60 within cylinder 40 and between plug 42 and partition 54. Head 50 and the adjacent portion of operating rod 48 are located in chamber 60. A return compression spring 62 surrounds this portion of operating rod 48 and abuts partition 54 and head 50. The periphery of head 50 is spaced from the inside surface of cylinder 40. Therefore, head 50 serves only as a retainer for the compression spring 62.

Inner chamber 60 contains a mixture of several alkane or paraffin waxes of different melting points which are selected so as to successively undergo a change of phase from solid to liquid as their temperature increases within the desired operating temperature range. Since the outward operating rod stroke is obtained by solid to liquid phase changes, a large force is obtained and the operating rod stroke/temperature curve is substantially linear over the desired temperature range due to the selection of the types and proportions of the waxes in the mixture. At the lower limit temperature, the wax mixture, in solid state, completely fills the void of inner chamber 60, and the mixture expansion with temperature increase exerts a greater force at the back than forwardly of head 50 due to the presence of operating rod 48, causing the head 50 to move away from plug 42 against the bias of return spring 62. Additional room is produced to receive the expanding compound because piston rod 48 moves out of inner chamber 60.

Such a heat actuated ram 38 as just described is known per se, since such a ram including its wax filling is sold by Actronics Incorporated, of 166 Beaver Hill Road, Waltham, Mass. 01254, U.S. The wax filling is identified by the trade name ACTROFILL number 1485. Applicant has found that a ram 38 having a operating rod stroke of about 0.7 inch with its cylinder part 40 having a diameter of 0.63 inch and length of about 3.2 inch exerts sufficient force and has a sufficient stroke to rotate the slats of most sizes and types of registers found on the market, through an angle of about 70° within a temperature range of about 55° F. to 90° F.

The thermal actuator end plug 42 is anchored to the register rim 14 by an elbowed bracket 64 through a bolt 66. Actuator 38 is maintained vertically across duct outlet 16 to be exposed to the supply air from duct 10. Preferably it is positioned adjacent a side wall of register frame 12 for esthetic purposes (see FIG. 3). Link 24 and clips 30 are disposed behind thermal actuator 38.

A sleeve-like extension 68 is screwed on the reduced diameter coupler end 70 of cap 46 and its outer end 72 is closed by a screw cap 74.

An operating rod extension 76, lodged in extension sleeve 68, is coaxially endwisely anchored, by its threaded stem 77 to operating rod 48. The free end portion of operating rod extension 76 carries a transverse arm 78 extending through and protruding outwardly from a slit 80 made lengthwisely of the extension sleeve 68. The outer end of arm 78 has an elongated slot 82 slidingly engaged by a pin 84 which transversely projects from the lower end portion of link 24. The length of slot 82 is sufficient to permit the horizontal back and forth movement component of link 24. Arm 78 has a collar portion 86 which slidably surrounds and is adjustably fixed on a bushing 88 which slidably surrounds the outer end of operating rod extension 76 and is retained by the head of a bolt 90 screwed within extension 76 at the end thereof. A set screw (not shown) is screwed in a lateral screw hole 96 of collar portion 86 to retain the latter on bushing 88. An overtravel compression coil spring 92 surrounds operating rod extension 76 within sleeve 68 and presses against a washer 89 at one end and against washer assembly 94 at the other end. Washer 89 freely surrounds rod extension 76 and abuts against collar portion 86. Washer assembly 94 surrounds operating rod extension 76 and abuts the enlarged end of operating rod 48.

The force required to compress spring 92 is greater than the force required to be exerted by operating rod 48 to pivot slats 18. During the normal outward stroke of the operating rod, the spring 92 is not compressed and presses against bushing 88. Should the supply air temperature exceed the maximum of the intended operating range, continued outward stroke of the operating rod is allowed despite the fact that the arm 78 has reached the bottom end of slit 80 or that the link 24 or other part of the actuator mechanism has struck the register frame 12. Spring 92 is compressed against stationary bushing 88 and operating rod extension 76 slides through bushing 88.

If an overtravel system is not required, the coil spring 92 is not used, and also bushing 88 if found advisable, and transverse arm 78 is fixed to operating rod extension 76 by a set screw ( not shown) screwed within a threaded hole 96 made in transverse arm collar portion 86. The set screw is accessible to a screwdriver because it registers with a longitudinal slit 98 made in sleeve-like extension 68. If the resistance to slat rotation is found to exceed the return force of the return spring 62, the device may include a second return spring 100 located within sleeve-like extension 68, surrounding operating rod extension 76 and compressed between collar portion 86 and screw cap 74 with the addition of intermediate centering washers 102.

The preferred operating temperature range is 60° F. to 90° F. With the supply air at 60° F. the slats are fully upwardly oriented as in FIG. 1, at 75° F. the slats are about horizontal and at 90° F. the slats are fully downwardly oriented as in FIG. 2.

For certain applications thermal actuator 38 can be installed within the air duct 10 or register frame 12, inwardly of slats 18 so as to be practically invisible.

I claim:

1. A temperature-responsive actuator mechanism for operatively controlling and adjusting within a predetermined temperature range the orientation of a set of parallel louver slats which are pivotally hinged to a common peripheral frame forming a register at the exit of an air duct of an air-conditioning system, said actuator mechanism comprising:
   (a) a ram adapted to be fixed to said frame in the path of the air flowing out of said register and defining a sealed inner chamber and a reciprocatable operating rod;
   (b) a mixture of several compounds with progressively-higher melting points within said temperature range, said mixture located in and filling said inner chamber, said mixture progressively expanding and responsive to temperature increase of the supply air out of said duct in said temperature range and acting on said operating rod to move the same away from said sealed chamber;
   (c) return biasing means, biasing said operating rod towards said sealed inner chamber;
   (d) an arm carried by said operating rod; and
   (e) motion-converting means, connected to said arm and adapted to be connected to said slats to convert reciprocating motion of said operating rod into rotational motion of said slats;
wherein, when duct air flow temperature increases, the expansion of the mixture in said ram inner chamber, forcibly biases said operating rod to move out of said sealed inner chamber, against the bias of said return biasing means, and when the duct air flow temperature decreases producing contraction of the mixture, said return biasing means causes said operating rod to move into sealed inner chamber.

2. An actuator mechanism as defined in claim 1, wherein said motion converting means includes resilient open-ended clips, releasably attachable to slats of already installed louvers.

3. An actuator mechanism as defined in claim 1, wherein the return biasing means includes a first spring located within said inner chamber a second spring located exteriorly of said ram, both springs acting on said operating rod.

4. An actuator mechanism as defined in claim 1, further including an overtravel system, to prevent damage to the actuator mechanism or to the louver slats, should the ram be exposed to temperatures beyond the upper limit of said temperature range.

5. An actuator mechanism as defined in claim 1, wherein said ram includes a cylinder in which said inner chamber is located and from one end of which said operating protrudes, a sleeve-like extension releasably attached to said one end, in alignment with the latter, surrounding the protruding part of said operating rod and having a free end portion axially protruding from said operating rod, said extension having an elongated slit parallel to said operating rod, said arm extending through said slit.

6. An actuator mechanism as defined in claim 5, wherein said arm is fixed to said operating rod, and further including a cap closing the free end of said sleeve-like extension and wherein said return biasing means includes a return compression coil spring located within said sleeve-like extension, surrounding the protruding part of said operating rod and bearing against said cap and against said arm.

7. An actuator mechanism as defined in claim 5, wherein said arm is slidable on said operating rod and further including a first stop carried by the free end of said operating rod and a second stop carried by said operating rod between said cylinder one end and said arm, and spaced from the latter, said arm coming to rest against said first stop, and an overtravel compression coil spring surrounding said piston rod and bearing against said second stop and said arm.

8. An actuator mechanism as defined in claim 7, further including a cap closing the free end of said sleeve-like extension and wherein said return biasing means includes a compression coil spring located within said sleeve-like extension, surrounding said operating rod and baring against said cap and against said arm.

* * * * *